United States Patent [19]

Hiser

[11] 4,173,994

[45] Nov. 13, 1979

[54] SOLAR ENERGY HEATING AND COOLING APPARATUS AND METHOD

[76] Inventor: Leland L. Hiser, Rte. 4, Box 361K, New Braunfels, Tex. 78130

[21] Appl. No.: 866,055

[22] Filed: Dec. 30, 1977

[51] Int. Cl.² .................... F25B 29/00; F28D 13/00; F24D 11/00; F24J 3/02
[52] U.S. Cl. .................... 165/48 S; 165/104 S; 237/1 A; 62/500; 126/427; 126/435
[58] Field of Search .............. 165/48, 18, 104 S; 62/500, 2; 237/1 A; 126/400

[56] References Cited

U.S. PATENT DOCUMENTS

| | | | |
|---|---|---|---|
| 2,257,983 | 10/1941 | Shipman | 62/500 |
| 2,396,338 | 3/1946 | Newton | 62/2 |
| 2,713,252 | 7/1955 | Jackson | 62/2 |
| 2,852,922 | 9/1958 | Neumann | 62/500 |
| 3,242,679 | 3/1966 | Puckett | 62/2 |
| 3,680,327 | 8/1972 | Stein | 62/500 |
| 3,935,897 | 2/1976 | Pulver | 165/1 |
| 3,996,759 | 12/1976 | Meckler | 62/2 |
| 4,007,776 | 2/1977 | Alkasab | 165/18 |
| 4,012,920 | 3/1977 | Kirschbaum | 165/104 S |
| 4,024,908 | 5/1977 | Meckler | 165/18 |

FOREIGN PATENT DOCUMENTS 799142 11/1968 Canada .................... 62/500

Primary Examiner—Charles J. Myhre
Assistant Examiner—Carl Stuart Miller
Attorney, Agent, or Firm—Gunn & Lee

[57] ABSTRACT

A method and apparatus for heating and/or cooling an enclosed area from solar energy is shown. A fluid is pumped into a concentrating solar energy collector for heating by the sun's rays. Fluid in the collector is vaporized and flows through a regulating valve for discharge through a jet compressor into a cooling condenser during the cooling cycle. A reduced pressure is created in an evaporator/heat exchanger by the jet compressor. Inside air conveys its heat to the evaporator/heat exchanger either directly or indirectly, and ambient outside air absorbs the heat from the cooling condenser. During the heating cycle, the heated fluid from the collector is directed into an energy storage tank. Heat from the energy storage tank is conveyed to the inside air through the evaporator/heat exchanger.

13 Claims, 5 Drawing Figures

FIG. 4

| MODE | FUNCTION | ROOM AIR FAN | CONDENSER FAN | POWER CYCLE PUMP | ENERGY STORAGE AND RECOVERY PUMP | AUXILIARY PUMP | AUXILIARY COMPRESSOR | AUXILIARY HEATING | SOLAR COLLECTORS | ENERGY STORAGE FLUID | 24 | 44 | 40 | 46 | 48 | 30 | 20 | 60 |
|---|---|---|---|---|---|---|---|---|---|---|---|---|---|---|---|---|---|---|
| SUMMER | COOLING | ON | ON | AUTO | OFF | OFF | OFF | OFF | SUN | AMBIENT TO COLD | a | a | a | a | a | a | a | a |
| SUMMER | COLD STORAGE | OFF | ON | AUTO | ON | OFF | OFF | OFF | SUN | AMBIENT TO COLD | a | a | a | a | a | a | a | a |
| SUMMER | COLD RECOVERY | ON | OFF | OFF | ON | ON | OFF | OFF | SHADE | COLD | a | a | a | b | b | a | a | a |
| SUMMER | AUXILIARY COOLING | ON | ON | OFF | OFF | OFF | OFF | OFF | SHADE | AMBIENT | a | b | a | a | a | a | a | a |
| SPRING/FALL | COOLING | ON | ON | AUTO | OFF | OFF | OFF | OFF | SUN | AMBIENT TO HOT | a | a | a | a | a | a | a | a |
| SPRING/FALL | AUXILIARY COOLING | ON | OFF | OFF | OFF | OFF | OFF | OFF | SHADE | AMBIENT TO HOT | a | b | a | a | a | a | a | a |
| SPRING/FALL | HEAT STORAGE | OFF | OFF | AUTO | ON | OFF | OFF | OFF | SUN | AMBIENT TO HOT | b | a | b | a | a | a | a | a |
| SPRING/FALL | HEAT RECOVERY | ON | OFF | OFF | ON | OFF | OFF | OFF | SHADE | HOT | b | a | b | b | b | a | a | a |
| SPRING/FALL | AUXILIARY HEATING | ON | OFF | OFF | OFF | OFF | ON | OFF | SHADE | AMBIENT | b | a | b | b | b | b | a | b |
| WINTER | HEATING | ON | OFF | AUTO | ON | OFF | OFF | OFF | SUN | AMBIENT TO HOT | b | a | b | b | b | a | b | a |
| WINTER | HEAT STORAGE | OFF | OFF | AUTO | ON | OFF | OFF | OFF | SUN | AMBIENT TO HOT | b | a | b | b | b | a | b | a |
| WINTER | HEAT RECOVERY | ON | OFF | OFF | ON | OFF | OFF | OFF | SHADE | HOT | b | a | b | b | b | a | b | a |
| WINTER | AUXILIARY HEATING | ON | OFF | OFF | ON | OFF | ON | OFF | SHADE | AMBIENT | b | a | b | b | b | a | b | b |

VALVE NUMBERS AND OPERATING POSITIONS a OR b

SOLAR ENERGY HEATING AND COOLING APPARATUS AND METHOD

BACKGROUND OF THE INVENTION

The present invention relates to solar heating and cooling, and more particularly to a solar heating and cooling system using a minimum number of energy exchanges, a single energy storage tank and a jet compressor.

BRIEF DESCRIPTION OF THE PRIOR ART

The design and construction of solar energy systems for home use is being considered by many different government groups, individuals and/or organizations. The need for an alternate energy source has been highlighted in recent years by oil embargos and accelerating costs of utilities. In the U.S. Patent and Trademark Office, one of the most acitve areas of patent prosecution is for solar energy apparatuses. However, despite the tremendous amount of efforts that have gone into the solar energy field, an economic and efficient system that can be used for both heating and cooling has not been designed. One of the basic problems in the prior systems is the large number of heat exchangers used in a combination heating and cooling system.

To date, most domestic uses of solar energy have been limited to heating systems, including heating water for swimming pools, water for domestic use, or an enclosed air space. Some applications of solar energy have been made for both heating and cooling systems wherein an expansion/absorption type of refrigeration system is used. However, an expansion/absorption type of refrigeration unit is normally prohibitive in cost and maintenance. If a water cooling tower is used, a large amount of maintenance is required.

Heat pumps have been used in some solar energy systems as shown in U.S. Pat. No. 3,996,759, but heat pumps have been found to be ineffective in combination with solar units for home heating and cooling.

One of the earlier systems for solar heating and cooling is shown in U.S. Pat. No. 2,396,338. However, the system is very expensive and uneconomical for current home usage.

Meckler (U.S. Pat. No. 4,024,908) shows another type of solar energy heating and cooling system that has a number of heat exchangers, including a motor and compressor driven by steam generated in the solar energy collectors from the sun's rays.

Once an efficient solar energy system has been designed, various methods of transporting the heated or cooled energy throughout the enclosed structure can be used. Also various arrangements of solar energy collectors can be utilized as shown in U.S. Pat. No. 3,935,897 and the patents cited therein.

Alkasab (U.S. Pat. No. 4,007,776) uses an ejector for creating a vacuum in the evaporator by injecting vaporized refrigerant therethrough into the condenser. Alkasab however uses a large number of heat exchanges, each of which requires a temperature gradient or loss.

Use of jet compressors is not new in refrigeration systems. For example, steam jet refrigeration systems have been used for many years as have two fluid systems utilizing fluids such as mercury and water wherein mercury is used as the motive fluid and water as the refrigerant. However, the jet compressor has been studied and discarded long ago as too inefficient for residential or commercial use other than where an ample supply of waste steam was available, or where some other requirement of the process was suited to the use of steam jet refrigeration.

In the solar energy field, the steam jet compressor has a unique application because an excess of energy is available for cooling purposes during the summer months if the system is designed to handle the heating required during the winter months. Therefore, if the collectors are sufficient to handle the normal heating requirements, there will be an excess of collectors available for summer cooling. Thus even though the coefficient of performance of a jet compressor system may be as low as 0.25, sufficient energy is collected by the solar collectors and available for cooling during the summer months. Such a jet compressor system is much lower in cost than an equivalent absorption type system, not to mention being much simpler and less complex.

SUMMARY OF THE INVENTION

It is an object of the present invention to provide a solar energy heating and cooling system.

It is yet another object of the present invention to provide a solar energy heating and cooling system that utilizes a minimum number of heat exchanges during either the heating or cooling cycle.

While a single fluid may be used in certain types of systems, it appears that two fluid systems are also very practical. A pump is used to cause fluid to flow through a concentrating solar energy collector where solar energy causes the fluid to vaporize. The solar energy collector has a header located thereon in combination with a regulation valve to maintain a relatively constant downstream pressure during the cooling cycle. The vapor is then discharged through a jet compressor into a condenser. The jet compressor creates a vacuum in an evaporator/heat exchanger thereby reducing the boiling point of the fluid contained therein. The fluid in the evaporator/heat exchanger is vaporized by absorbing heat from the circulated air inside of an enclosed area to give an air conditioned area. If more cooling is provided than is necessary, excess is stored in an energy storage tank. When solar cooling is not available, energy stored in the energy storage tank is then used for cooling the enclosed area. Only if solar energy is not available and the stored energy has been depleted is it necessary for an auxiliary system to provide cooling to the enclosed area.

During heating from a solar energy system, the fluid as heated in the solar energy collector may be either used directly to heat the enclosed air space or stored in the energy storage tank. Energy from the energy storage tank could then be used as needed to heat the enclosed area. All that is necessary to reclaim energy from the energy storage tank (either during heating or cooling) is to circulate fluid from the energy storage tank through a heat exchanger that transfers energy with the circulating air. A pump used to circulate the fluid uses only a nominal amount of electricity. Again, only if solar energy is not available, and if the energy storage tank has been depleted, is an auxiliary heat source necessary.

By the use of an automated control system, all the user needs to do is to switch the mode of operation of the system from summer, to spring/fall or to winter. Thereafter, the control system automatically operates the appropriate valving and pumps for the solar energy system.

By use of a single energy storage tank, either heat or cold can be stored during the respective heating or cooling cycles. During the spring or fall when the diurnal temperature may fluctuate to require both heating and cooling, the energy storage tank is used to only store heat because heat is normally required in the nighttime and early morning hours when solar energy is not available. Cooling may be provided directly from the solar energy system and, if cooling is not required, the heat from the solar energy collector would be stored in the energy storage tank.

BRIEF DESCRIPTION OF THE DRAWINGS

FIG. 4 is a table showing the condition of various sensors and valves in response to the heating or cooling requirements of the solar energy system shown in FIG. 1.

DESCRIPTION OF THE PREFERRED EMBODIMENT

Figure 1:
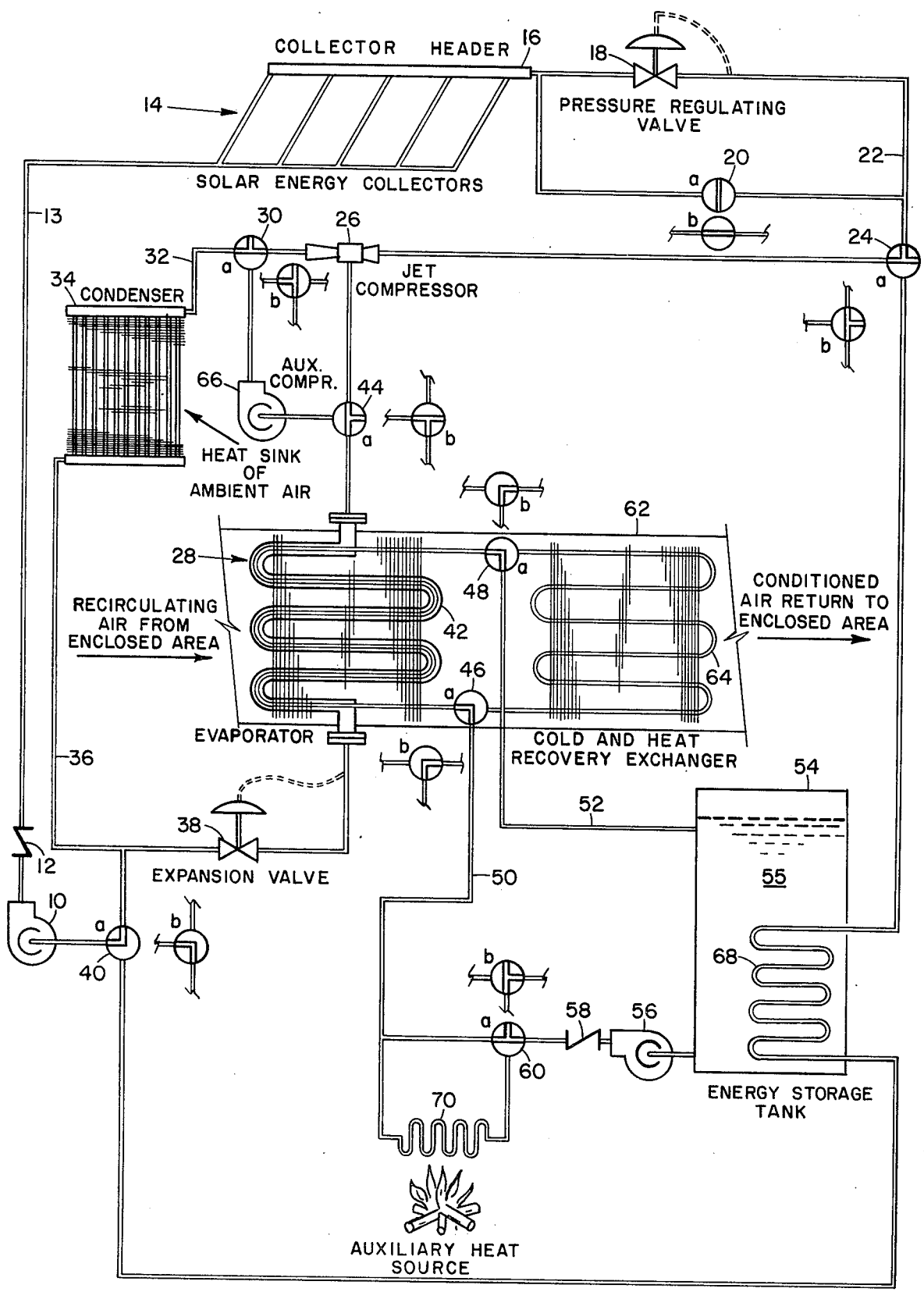
FIG. 1 is an illustrative schematic diagram of a two fluid solar energy heating and cooling system.

Referring to FIG. 1 of the drawings, a solar energy heating and cooling system is shown in schematic form. To start the operation of the system, a pump 10 pumps a fluid through check valve 12 to solar energy collectors 14. While many different fluids could be used, the applicant envisions the use of a Freon as the collector fluid.

In the solar energy collectors 14, which may be of the concentrating type, a collector header 16 is provided at the opposite end thereof. The collector header 16 provided at the opposite end of solar collectors 14 from pump 10 is relatively large and serves as a flash tank for the storage of energy, and to smooth out disturbances caused by intermittent shading of the solar energy collectors 14 for short periods of time. Such shading could be caused by passing of scattered clouds between the sun and the solar energy collectors 14. A pressure regulating valve 18 is located downstream of the collector header 16.

The positions of the valves (which will be individually described hereinafter) are shown in the system in FIG. 1 in position "a" for the summer cooling mode of operation with the solar energy collectors 14 providing sufficient energy for cooling the enclosed area and for storing a portion of the energy. Alternative modes of operation will be described hereinafter with various valves being in position "b" shown immediately adjacent to position "a".

During the summer cooling mode of operation, by-pass valve 20 is closed. Vaporized fluid travels via pressure regulating valve 18, conduit 22 and control valve 24 to jet compressor 26. The vaporized fluid received in jet compressor 26 is discharged through a nozzle, mixing chamber and pressure recovery diffuser thus creating a vacuum in and drawing vapor from evaporator 28. The fluids are mixed in and discharged from jet compressor 26. The mixture flows through auxiliary control valve 30 and conduit 32 to the condenser 34. The pressure of the fluid mixture discharged from the jet compressor 26 is between the high pressure received from the pressure regulating valve 18 and the vacuum created in the evaporator 28. Inside of condenser 34, the vaporized fluid is condensed with the heat being given off by any convenient means, such as circulation therethrough of ambient outside air.

From the condenser 34, the liquid flows via conduit 36 through either the expansion valve 38 or control valve 40. Fluid that flows through control valve 40 is recirculated by the pump 10 to the solar energy collectors 14. Fluid flowing through expansion valve 38 is received back into evaporator 28. Inside of evaporator 28 and forming a part thereof are two concentric tubes 42. The outer of the concentric tubes 42 receives fluid from the expansion valve 38. While in the evaporator 28, the fluid received from expansion valve 38 is vaporized. During vaporization, heat is absorbed from the surrounding environment. Therefore, by recirculating air from an enclosed area, the recirculating air is cooled by vaporization inside of the outer portion of concentric tubes 42 in evaporator 28. The vacuum created in evaporator 28 by the jet compressor 26 allows fluid to flow from the condenser 34 through expansion valve 38 into evaporator 28 to replace vaporized fluid. From evaporator 28, the vaporized fluid flows through auxiliary control valve 44 to the vacuum side of the jet compressor 26 for recirculation to the condenser 34.

The inner portion of the concentric tubes 42 is connected through storage control valves 46 and 48, and conduits 50 and 52 to energy storage tank 54. The energy storage tank 54 may be filled with any suitable fluid, such as brine 55, which is also contained in conduits 50 and 52 and the inner portion of concentric tubes 42. During the storing of "cold energy" for subsequent cooling (assuming that the recirculating air is OFF or does not deplete the cold energy available), energy storage and recovery pump 56 circulates the energy storage fluid 55 through check valve 58 and auxiliary control valve 60 for circulation through the evaporator 28. Heat is absorbed from the energy storage fluid 55 in evaporator 28 by the vaporization inside of the outer portion of concentric tubes 42.

Assume next that cooling is not required inside of the enclosed area; therefore, a fan (not shown) causing the recirculation of air from the enclosed area through the heating and cooling conduit 62 is turned OFF. Now essentially all of the energy from the solar energy collectors 14 as transmitted to the evaporator 28 is stored in energy storage tank 54. Thus, the solar energy is being used to (1) cool the air circulating from the enclosed area, (2) cool the energy storage fluid 55 inside of energy storage tank 54, or (3) cool both at once.

Next assume that the solar energy collector is no longer supplying a vaporized fluid to drive the jet compressor 26 and create a vacuum in evaporator 28, which would occur during shading of the solar energy collectors 14 or at nighttime. Therefore, any cooling required by the enclosed area must be recovered from the energy storage tank 54. By the switching of the storage control valves 46 and 48 to position "b", the energy storage and recovery pump 56 will now circulate the energy storage fluid 55 through a cold and heat recovery exchanger 64. The heat recovery exchanger 64 is located in heating and cooling conduit 62 along with evaporator 28. By the circulation of the cooled energy storage fluid 55 from energy storage tank 54 through cold and heat recovery exchanger 64, and the turning ON of a recirculating fan (not shown), cooled air is supplied to the enclosed area.

If the cold energy stored in energy storage tank 54 is depleted and the solar energy collectors 14 are not providing sufficient cooling, auxiliary control valves 30 and 44 may be changed to position "b" and auxiliary compressor 66 energized. Auxiliary compressor 66 simply bypasses the jet compressor 26 with the fluid being returned via condenser 34, expansion valve 38, and evaporator 28 to compressor 66 thereby completing the auxiliary cooling cycle.

Assume that the solar energy heating and cooling system as shown in FIG. 1 is set on a winter mode requiring heating. If the solar energy collectors 14 are receiving energy from the sun, various valves will be changed to position "b". Included among the various valves changing to position "b" are bypass valve 20, control valve 24, control valve 40, and cold storage valves 46 and 48. From control valves 20 and 24, the heated fluid from solar energy collectors 14 (which may be in either liquid or vapor form) is received in heat exchanger 68 located inside of energy storage tank 54. The heat exchanger 68 which has fluid heated by the solar energy collectors 14 flowing therethrough will in turn heat the energy storage fluid 55 contained in energy storage tank 54. By operation of the energy storage and recovery pump 56 to circulate the heated energy storage fluid 55 through cold and heat recovery exchanger 64, air from the enclosed area is heated as it recirculates through cold and heat recovery exchanger 64 located in the heating and cooling conduit 62.

If no heating is required, energy storage and recovery pump 56 is simply turned OFF. If no heat is being supplied by the solar energy collectors 14, pump 10 is turned OFF so that fluid does not continue to circulate through heat exchanger 68. However, heat already stored in energy storage tank 54 may be recovered by the continued operation of energy storage and recovery pump 56 to circulate the heated energy storage fluid 55 through cold and heat recovery exchanger 64.

Assuming that all of the heat in the energy storage tank 54 has been depleted and additional heating is required, auxiliary control valve 60 is switched to position "b" so that auxiliary heat may be supplied by the auxiliary heat source 70. The auxiliary heat source 70 may be of any convenient type, such as gas or electric.

Assume now that the solar energy system as shown in FIG. 1 is in the spring/fall mode. In this mode, the energy storage and recovery pump 56 does not circulate the energy storage fluid 55 through the evaporator 28 during cooling, either solar or auxiliary. Therefore, cold energy will not be stored in the energy storage tank 54. During periods of non-cooling, the energy storage fluid 55 is heated due to circulation by pump 10 of the heated fluid from the solar energy collectors 14 through heat exchanger 68. During the spring/fall mode, there will be a storage of heat in the energy storage tank 54, but not a storage of cold. This type of arrangement coincides with cooling normally being required during the daylight hours when solar energy is available, and heat being required at nighttime hours when direct solar energy is unavailable.

Figure 3:
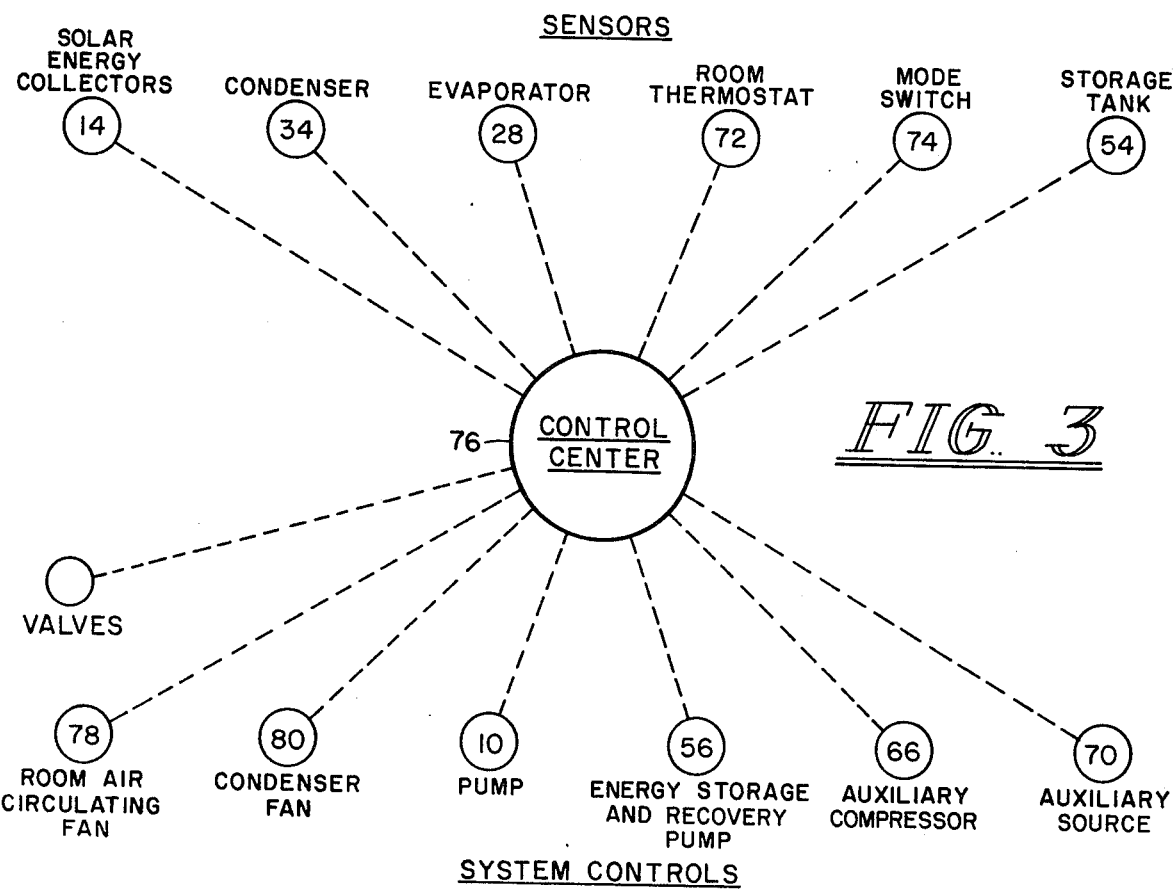
FIG. 3 is an illustrative block diagram of system controls for FIG. 1.

Referring now to FIG. 3 of the drawings, a schematic block diagram of the control system is shown. Referring to the blocks individually, the solar energy collectors 14 would have some type of sensor(s) therein, such as a pressure, temperature or liquid level sensor. Similarly, the condenser 34 may also have pressure, temperature or liquid level sensor(s). To insure the proper operation of the evaporator 28, normally a liquid level and/or pressure sensor(s) is also included. Naturally, a room thermostat 72 is operated off of the temperature of the enclosed area. The mode switch 74 is manually operated and is the only switch that needs to be operated by the individual as the seasons of the year change. The energy storage tank 54 has sensors therein of temperature and/or liquid level. All of the inputs from the various sensors are fed into a central control 76, which then operates the room air circulating fan 78, condenser fan 80, pump 10, energy storage and recovery pump 56, numerous valves (individually numbered), auxiliary compressor 66, or auxiliary heat source 70. While the control center 76 is not shown in detail, it is within the knowledge of those skilled in the art for the designing of such a system. As a typical example of how the system controls shown in FIG. 3 can work, FIG. 4 has a table of the various modes as manually set in by the mode switch. Thereafter, each function as required of the central control 76 is clearly shown. The positions of the various system controls, including the numerous valves, are shown. Position "a" of the valves corresponds to the position shown in the initially described mode and conditions, and position "b" corresponds to other modes and/or conditions of operation. It is fully appreciated that variations in valving can be made without varying from the scope and intent of the invention as shown in FIG. 1.

ALTERNATIVE EMBODIMENT

Figure 2:
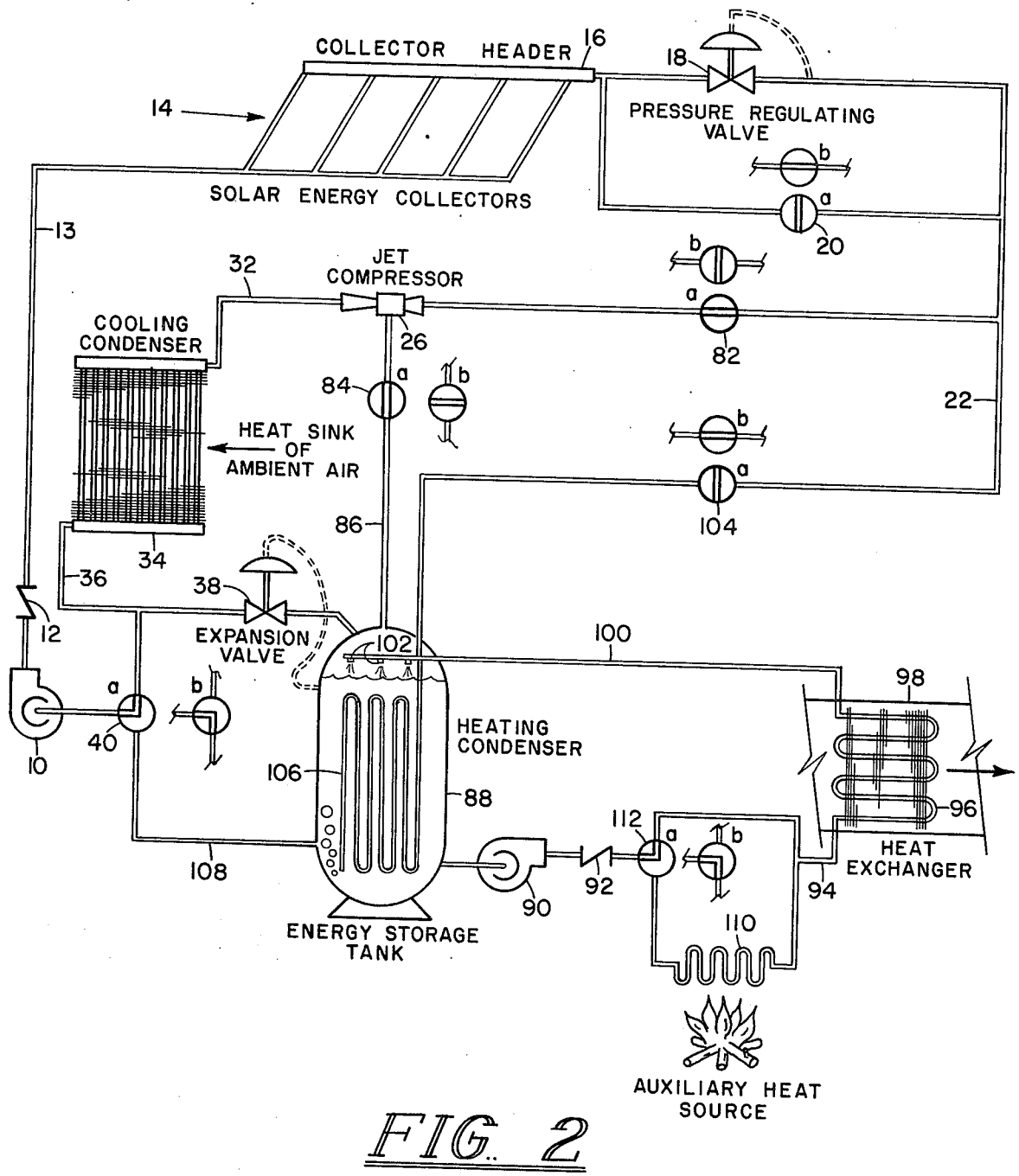
FIG. 2 is an illustrative schematic diagram of an alternative embodiment showing a single fluid solar energy heating and cooling system.

Referring now to FIG. 2 of the drawings, there is shown a single fluid solar energy heating and cooling system. Like numerals that were used to describe like components previously shown in FIG. 1 will be used again in the description of FIG. 2. However, many components shown in FIG. 2 do not have the same counterpart as shown in FIG. 1 and therefore will have a different numerical designation hereinbelow.

The pump 10 pumps a fluid through check valve 12 and conduit 13 to solar energy collectors 14. The fluid may be of any suitable type, such as water. The solar energy collectors 14 may be of the concentrating type, such as a parabolic trough, concentrating the sun's rays on a conduit extending along the focal line of the reflected energy.

On the opposite end of the solar energy collectors 14 from the pump 10 is located the collector header 16, which accumulates a volume of heated fluid. Normally, the pressure and temperature of the accumulated solar heat fluid in the collector header 16 is greater than that required to operate the jet compressor 26. This higher temperature and pressure is due to back pressure from pressure regulating valve 18, which tends to open or close to maintain a relatively constant pressure on the jet compressor 26. The operation of the pressure regulating valve 26 also provides a storage system for solar heated fluid to even out fluctuations caused by intermittent shading of solar energy collectors 14. For instance, in the event of a cloud shading solar energy collectors 14, vaporization rate in the solar energy collectors 14 drops to nil while the jet compressor 26 still demands high pressure motive gas. As as result, the pressure in conduit 22 drops slightly, and pressure regulating valve 18 responds by opening. As pressure regulating valve 18 opens, the pressure is reduced in collector header 16 so that a portion of the heated liquid flashes to vapor to supply the demand of the jet compressor 26.

During the cooling cycle, the main jet compressor valve 82 is open, as well as the jet compressor suction valve 84. As the high pressure fluid in conduit 22, which is in the vapor state, flows through the jet compressor 26, a vacuum is created via jet compressor suction valve 84 and conduit 86 in the energy storage tank 88. From the jet compressor 26, the mixture of vaporized fluids flow through conduit 32 into cooling condenser 34. Inside of cooling condenser 34, the vaporized fluids are condensed into the liquid state. Due to the pressure differential across expansion valve 38, condensed fluid flows from cooling condenser 34 via conduit 36 for expansion therethrough to allow vaporization of the fluid in energy storage tank 88. A portion of the condensed fluids in cooling condenser 34 is recirculated via pump 10 and control valve 40 to the solar energy collectors 14.

The vaporization of the fluid inside of energy storage tank 88 by boiling at low pressure absorbs heat from the fluid contained inside of energy storage tank 88 to reduce the temperature of the fluid.

From the energy storage tank 88, pump 90 circulates the chilled fluid through conduit 94 and check valve 92 into heat exchanger 96. The heat exchanger 96 is located in the room air duct work 98 so that as chilled fluid from the energy storage tank 88 flows therethrough, heat is absorbed from the room air. From the heat exchanger 96, the fluid is circulated through conduit 100 back to energy storage tank 88 via spraying heads 102. Return of the fluid to energy storage tank 88 through spraying heads 102 facilitates the flash cooling of the recycle fluid by increasing liquid surface area and by reducing temperature gradients within the liquid droplets.

In order to have sufficient energy stored for suitable periods of shading or darkness, a relatively large volume energy storage tank 88 is required. Therefore, a relatively inexpensive refrigerant fluid, such as water, is important to make this embodiment economically feasible. In the event that water is used as the refrigerant, the energy storage tank 88 and the cooling condenser 34 must be at a pressure considerably less than atmosphere during the cooling mode. For example, to have a chilled water temperature of 40° F. requires a pressure of 0.12 psia in the energy storage tank for vaporization as compared to atmospheric pressure of 14.7 psia. In the event that air leaks into the system under such low pressures, a vacuum pump (not shown) or other means may be necessary to remove air or other noncondensable fluids from the system. Such noncondensable fluids will normally accumulate in the cooling condenser 34 to which a vacuum pump (not shown) can be connected.

An auxiliary cooling system can be provided in this alternative embodiment the same as shown in conjunction with FIG. 1. However, if water is used as the refrigerant, the auxiliary compressor would have to draw a very high vacuum and have to handle large displacement volumes. Thus, it may be more practical to provide an entirely separate auxiliary cooling system.

Assume now that the single fluid system as shown in FIG. 2 is being used for heating. The main jet compressor valve 82 is closed, jet compressor suction valve 84 is closed, control valve 40 is switched, bypass valve 20 is opened and heating valve 104 is opened, positions of the valves being shown as position "b". The fluid heated by the solar energy collectors 14 now flows through the bypass valve 20 and the heating valve 104 into the heating condenser 106 and thence into energy storage tank 88. The heating condenser 106 condenses any vapors contained in the heated fluid prior to discharge into the energy storage tank 88. From the energy storage tank 88 through conduit 108, the fluid flows through control valve 40 to the pump 10 for recirculation to the solar energy collectors 14. For heating of the enclosed area, pump 90 circulates the heated fluid from energy storage tank 88 through heat exchanger 96, which conveys heat to air circulating from the enclosed area.

Assuming that sufficient heating is not being supplied by the solar energy collectors 14 and that heat energy stored in energy storage tank 88 has been dissipated, then auxiliary heat source 110 may be switched into the circulation line by switching auxiliary heat source valve 112 to position "b". The switching of the auxiliary heat source valve 112 directs the fluid being circulated from the energy storage tank 88 by the pump 90 through the auxiliary heat source 110 for additional heating by any suitable means, such as gas or electricity. The heating of the fluid may then be transmitted to the heat exchanger 96 located in the room air duct work 98 for appropriate heating.

In the event that solar energy collectors 14 are not supplying heat energy to the heat storage tank 88 due to shading, the pump 10 is turned OFF, and energy stored in energy storage tank 88 is utilized until depleted. After depletion of the stored energy in the energy storage tank 88, then the auxiliary heat source 110 is used. An entirely separate auxiliary heat source could be used the same as an entirely separate auxiliary cooling system.

One possible mode (not shown) would be to include an appropriate valving arrangement wherein during the winter months the heated fluid from the solar energy collectors 14 would flow through the heat exchanger 96 prior to circulation to the energy storage tank 88. This particular mode of operation may be used either in this alternative embodiment or in the preferred embodiment.

Figure 5:
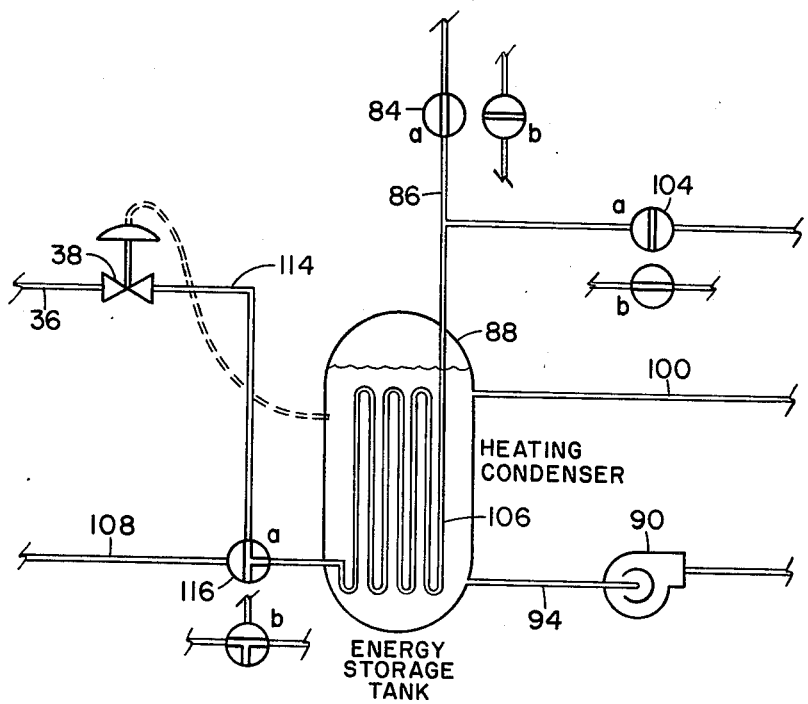
FIG. 5 is a partial schematic view modifying FIG. 2 to a two fluid system.

FIG. 5 shows a modified version of the single fluid system of FIG. 2 to convert the alternative embodiment of FIG. 2 to a two fluid system. FIG. 5 only shows the modified portions of the previously described FIG. 2. Assume that during the cooling cycle a vacuum is still being created at the jet compressor suction valve 84. Therefore, a vacuum is also drawn in the heating condenser 106 which serves as the evaporator in the cooling mode. However, the return of the liquified fluid through conduit 36 and expansion valve 38 is received on the opposite end of heating condenser 106 from the vacuum created by the jet compressor 26 (see FIGS. 2 and 5). From expansion valve 38, the fluid flows through conduit 114 and control valve 116 into the heating condenser 106. Therefore, the fluid as contained in energy storage tank 88 will not mix with the fluid flowing through heating condenser 106 and the solar energy collectors 14. In the two fluid system as shown in FIG. 5, the fluid flowing through the solar energy collectors 14 may be of any suitable type, such as Freon. A typical fluid that may be used in the energy storage tank 88 may be brine. Again, the pump 90 circulates the fluid through conduit 94, and the heat exchanger 96 (shown in FIG. 2), and back into the energy storage tank 88 via conduit 100. The spraying heads 102 (as shown in FIG. 2) have been eliminated, and the return of the fluid via conduit 100 is below the fluid level.

During heating, jet compressor suction valve 84 is closed, and heating valve 104 is opened as shown in position "b". The fluid as heated in the solar energy collectors 14 flows directly into the heating condenser 106 where the heat is transferred to fluid contained in energy storage tank 88. From the heating condenser 106, the fluid contained therein continues its flow through control valve 116 (which has been switched to position "b") and back through the pump 10 (shown in FIG. 2) via conduit 108.

By the use of a two fluid system as shown in FIG. 5, a common energy storage tank 88 may be either heated or cooled, depending upon the mode of operation. Also by having a refrigerant other than water, the exceeding low vacuum pressures are no longer required.

I claim:

1. A system for heating and cooling an enclosed space from solar radiation comprising:
   solar energy collector means for receiving a fluid and heating said fluid from said solar radiation;
   control means of said system being connected to said collector means, said control means having at least a heating mode and cooling mode of operation;
   conduit means connecting to said collector means;
   valving means in said conduit means operated by said control means;
   a single energy storage tank being connected by said conduit means and valving means to receive said fluid from said collector means therein, said single energy storage tank storing said fluid in either heated or cooled state as regulated by said control means;
   said system for heating including:
      at least two heat exchanger means connected by said conduit means and valving means for heating air from said enclosed space circulated therethrough, and for heating an energy storage fluid in said energy storage tank from heated fluid received from said collector means;
   said system for cooling including:
      jet compressor means connected by said conduit means and valving means to receive pressurized and vaporized fluid from said collector means, said jet compressor means discharging into condenser means;
      evaporative means receiving liquified fluid from said condenser means via said conduit means and said valving means, said evaporator means vaporizing said fluid in response to a low pressure drawn therein by said jet compressor means via said conduit means, said evaporator means thereby cooling said air from said enclosed space and said energy storage fluid in said energy storage tank;
      control means operable to actuate said jet compressor means to provide cooling as required during sunlight hours and to store said energy storage fluid in said single energy storage tank for recovery during cooler hours when said jet compressor means is not required for cooling purposes,
   first circulation means for moving said fluid through said conduit means and valving means to said collector means.

2. The solar heating and cooling system as given in claim 1 wherein said collector means includes a header means and pressure regulating valve means connected to said header means for regulating pressure of said fluid received by said jet compressor.

3. The solar heating and cooling system as given in claim 1 wherein said fluid in said collector means and said energy storage fluid are the same, said energy storage tank including said evaporator means therein.

4. The solar heating and cooling system as given in claim 1 wherein said evaporator means is located in said energy storage tank and including a second circulating means for moving said energy storage fluid from said energy storage tank via said conduit means and valving means to said heat exchanger means for alternatively heating and cooling said enclosed space.

5. The solar heating and cooling system as given in claim 1 further comprising auxiliary heating and cooling means connected by said conduit means and valving means to alternatively heat and cool said enclosed space.

6. The solar heating and cooling system as given in claim 1 wherein said evaporator means has a plurality of tubes therethrough, a first of said tubes being connected to said jet compressor means for vaporization of said fluid, a second of said tubes being connected by second circulating means to said energy storage tank.

7. The solar heating and cooling system as given in claim 6 wherein said valve means and said second circulating means moves said energy storage fluid through said conduit means to a heat recovery exchanger to use storage energy in said energy storage tank to regulate temperature in said enclosed space.

8. A method of heating and cooling an enclosed space from solar energy consisting of the following steps:
   heating a fluid in a solar energy collector means;
   controlling flow of said fluid from said collector means in response to at least a heating mode and a cooling mode by valving means and conduit means;
   regulating pressure of said fluid from said collector means during said cooling mode by pressure regulating valve means;
   discharging said pressurized fluid from said pressure regulating valve means through a jet compressor into condenser means;
   drawing a low pressure in evaporator means by said jet compressor, said evaporator means being connected to said condenser means by expansion valve means;
   cooling of air being circulated from said enclosed space by said evaporator means during said cooling mode;
   first storing of excess cooling in an energy storage tank during said cooling mode via said conduit means and said cooling means connecting said energy storage fluid of said energy storage tank to said evaporator means;
   second storing of excess heating in said energy storage tank during said cooling mode via said conduit means connecting said energy storage fluid to said energy storage tank and to said solar energy collector means;
   moving said heated fluid from said collector means via said valving means and conduit means to heat exchanger means during said heating mode;
   heating air circulated from said enclosed space across said heat exchanger means during said heating mode;
   third storing of excess heating in said energy storage tank during said heating mode via said conduit means and said valving means connecting said energy storage tank to said fluid received from and heated by said collector means; and
   returning said fluid to said collector means.

9. The method of solar heating and cooling as given in claim 8 including recovering stored heating/cooling by circulating said energy storage fluid through a recovery exchanger of said heat exchanger means by pump means and circulating air from said enclosed space thereacross.

10. The method as given in claim 9 wherein said energy storage fluid and fluid from said collector means are the same.

11. The method as given in claim 9 wherein said energy storage fluid and fluid from said collector means transfer energy therebetween.

12. The method as given in claim 9 includes said evaporator means located in said energy storage tank.

13. The method as given in claim 9 wherein said heat exchanger means is located in said energy storage tank and air from said enclosed space is heated by said recovery exchanger.

* * * * *